United States Patent
Weingart et al.

(10) Patent No.: US 7,192,304 B2
(45) Date of Patent: Mar. 20, 2007

(54) UNIVERSAL CARD HOLDER FOR ELECTRONIC DEVICES

(75) Inventors: Peter Weingart, Bochum (DE); Wolfgang Theimer, Bochum (DE); Roland Schink, Recklinghausen (DE); Mika Suonmaa, Herne (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/367,923

(22) Filed: Mar. 3, 2006

(65) Prior Publication Data

US 2006/0211306 A1 Sep. 21, 2006

(30) Foreign Application Priority Data

Mar. 17, 2005 (WO) ............... PCT/IB2005/000681

(51) Int. Cl.
*H01R 13/60* (2006.01)
(52) U.S. Cl. .............. 439/541.5; 439/630; 439/377
(58) Field of Classification Search ........... 439/541.5, 439/630, 631, 633, 634, 377, 946
See application file for complete search history.

(56) References Cited

U.S. PATENT DOCUMENTS

| 5,608,606 | A  | * | 3/1997  | Blaney ................. 361/686 |
| 5,847,932 | A  |   | 12/1998 | Kantner |
| 6,287,143 | B1 |   | 9/2001  | Lwee |
| 2001/0053622 | A1 | * | 12/2001 | Oguchi ................. 439/188 |
| 2005/0287861 | A1 | * | 12/2005 | Wong et al. ............ 439/377 |

* cited by examiner

*Primary Examiner*—Ross Gushi
(74) *Attorney, Agent, or Firm*—Hollingsworth & Funk, LLC

(57) ABSTRACT

A card holder for a mobile electronic device for receiving accessory cards, which includes a substantially cuboidal housing having an open front face for inserting accessory cards, the housing including a back face, a left and a right lateral face, and a top and a bottom face, at least two guiding elements protruding from the interior side of the left and right lateral faces, respectively, and extending parallel to and between said top and said bottom face. The guiding elements define an upper slot of a first height $h_1$ between the top face and the guiding elements and a lower slot of a second height $h_2$ between the bottom face and the guiding elements, for receiving accessory cards of first height $h_1$ and second height $h_2$, respectively, and the upper and the lower slots together define a combined slot for receiving an accessory card of a third height $h_3$.

10 Claims, 5 Drawing Sheets

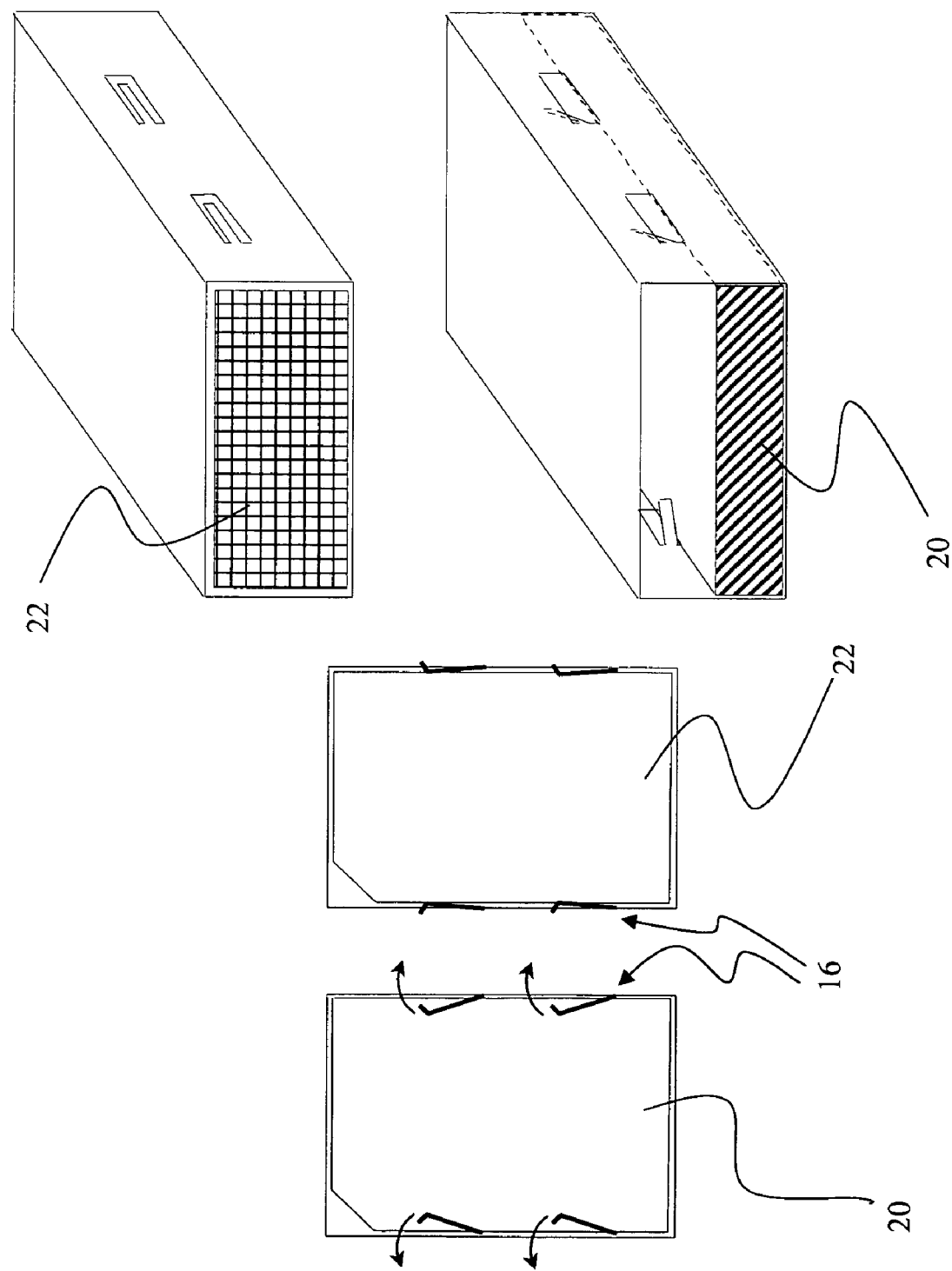

UNIVERSAL CARD HOLDER FOR ELECTRONIC DEVICES

FIELD OF THE INVENTION

The present invention relates to a card holder for electronic devices and an electronic device equipped with such a card holder. The invention particularly relates to a card holder being able to receive up to two single-height accessory cards simultaneously, as well as one accessory card of substantially double height.

BACKGROUND

Particularly since the use of mobile electronic devices, ranging from laptop computers to small electronic devices like PDAs and mobile phones, holders for accessory cards have become widely used. There are mainly two types of such accessory cards which are intended to enhance the capabilities of an electronic device. Examples of the first type are memory cards like compact flash, MMC, SD cards or the like, which are used as portable memory devices for exchanging data. Another type that has become rather popular recently is related to wireless interface cards providing different wireless connection capabilities like Bluetooth, WLAN and the like. Particularly for the known PCMCIA card holder or slot and the compact flash slot also other accessory devices are available, like GPS modules, camera modules and other extension modules.

The number of such card holders, also referred to as extension slots, is always a limitation, particularly in mobile devices as laptops, PDAs and mobile phones. In case only one such holder is provided the situation may occur that a user is forced to change between different extension modules like the camera and the GPS module, or the user even desires to use two such modules simultaneously, e.g. for sending a video-clip recorded with a camera module wirelessly to another user with a Bluetooth module.

Another problem related to such extension cards is that there are in some cases two form factors available for cards of the same type, such with single height and such with double height.

Therefore it is an object of the present invention to provide a universal card holder which enables to insert one or two cards with single height, as well as one card having substantially double height, and also a device comprising such a card holder.

SUMMARY OF THE INVENTION

According to an aspect of the present invention a card holder for a mobile electronic device is provided. The card holder for receiving accessory cards includes a substantially cuboidal housing having an open front face for inserting accessory cards, where the housing is constituted by a back face, a left and a right lateral face, and a top and a bottom face. At least two guiding elements protrude from the interior side of the left and right lateral faces, respectively, and extend parallel to and between the top and the bottom face. In one embodiment the guiding elements define an upper slot of a first height $h_1$ between the top face and the guiding elements and a lower slot of a second height $h_2$ between the bottom face and the guiding elements, for receiving accessory cards of first height $h_1$ and second height $h_2$, respectively. The upper and lower slots together define a combined slot for receiving an accessory card of a third height $h_3$.

Such a universal card holder can thus be used for at least two different card types, with respect to the mechanical dimensions, and can also accommodate up to two accessory cards of first and second heights (in the further description also referred to as "single-height cards") and one accessory card of third height (in the further description also referred to as a "double-height card"). The card holder according to the invention therefore enables a simultaneous use of two single-height cards, e.g. a camera module and a Bluetooth module, for capturing videos and at the same time sending it to some other user. Furthermore the card holder can accommodate "bigger" cards of substantially double height, like a UMTS wireless interface card or the like. The card holder can of course be used with memory cards as well as other accessory cards.

The height of the combined slot will usually range between $h_1+h_2$ and substantially $h_1+h_2+h_r$, wherein $h_r$ is the height of the guiding elements. As it might be necessary to provide a certain mechanical freedom in order for inserted cards not to become jammed in a slot these dimensions are not to be understood as strict limitations, but can be varied as required.

In an exemplary embodiment said guiding elements are resiliently arranged on said left and right lateral faces, in order to be pushed aside by an accessory card of a third height $h_3$ being inserted into said combined slot, such that said accessory card of third height can be received in said card holder unobstructed by said guiding elements. This enables inserting double-height cards of the same width as the single-height cards to be inserted in the card holder, as the guiding elements will be pushed aside exposing the full width that is available for the single-height cards also for double-height cards.

In an exemplary embodiment said guiding elements are split into upper and lower guiding element sections associated to said upper and lower slots, respectively. Said upper and lower guiding element sections are resiliently arranged on said left and said right lateral face, in a fashion to be movable independent of each other, such that only the guiding element section associated to a respective slot is pushed aside by an accessory card of first or second height $h_1/h_2$ being inserted into that slot, such that said accessory card of first or second height can be received in that slot unobstructed by the associated guiding element section. This enables to provide a card holder with a height of the combined slot that is as small as possible. Providing extension slots with the minimal required height is advantageous and possibly even essential particularly in mobile devices with limited available space.

In an exemplary embodiment the card holder further comprises at least one resilient element arranged on the inner side of said top or said bottom face for spring-biasing accessory cards received in said card holder towards said bottom or said top face, respectively. This embodiment is particularly advantageous in cases where the height the of guiding elements adds up to the total height of the combined slot, and wherein this combined slot is though intended to accommodate only cards having more or less exactly the double height than single-height cards. The mechanical play can be eliminated for such cards, while the resilient element can be pushed aside similarly to the guiding elements when only single-height cards are used.

In an exemplary embodiment the card holder further comprises a third electrical interface adapted for electrically contacting an accessory card of third height. Usually it is intended that cards are used with a card holder according to the invention which make use of either of the electrical interfaces for the single-height cards. However with this embodiment also double-height cards can be used which can not contact one of those interfaces but use their own contact layout. This enables manufacturers to provide card holder also being adapted for such special double-height cards.

In an exemplary embodiment the guiding elements are constituted by spring-biased guiding rails, wherein the guiding rails are formed tapering towards the open front face of said housing. Implementing the guiding elements as rails is a simple and efficient method. The tapering, e.g. providing a wedge-shaped front end on the rails, is necessary in order to enable easy and smooth insertion of a card, for improving the usage comfort as well as avoiding damaging the card due to excessive necessary force.

In an exemplary embodiment the guiding elements are constituted by resilient curved strips. The advantages to be achieved with such an implementation will be explained in conjunction with FIG. 3.

In an exemplary embodiment the guiding elements are constituted by resilient tongues. The advantages to be achieved with such an implementation will be explained in conjunction with FIG. 5.

According to another aspect an electronic device is provided by the present invention, the device comprising a card holder according to one of the aforementioned embodiments.

It is preferred that the electronic is a mobile phone. As already mentioned the card holder of the invention is particularly useful when used in conjunction with small mobile electronic devices having only limited space available for providing extension slots.

BRIEF DESCRIPTION OF THE DRAWINGS

A better understanding of the present invention can be achieved by referring to the attached drawings, which are provided to illustrate non-limiting exemplary embodiments, and wherein

FIG. 5 shows still another embodiment, in both top and 3-dimensional view, wherein the guiding elements are embodied as resilient latches.

DETAILED DESCRIPTION OF THE INVENTION

Figure 1:
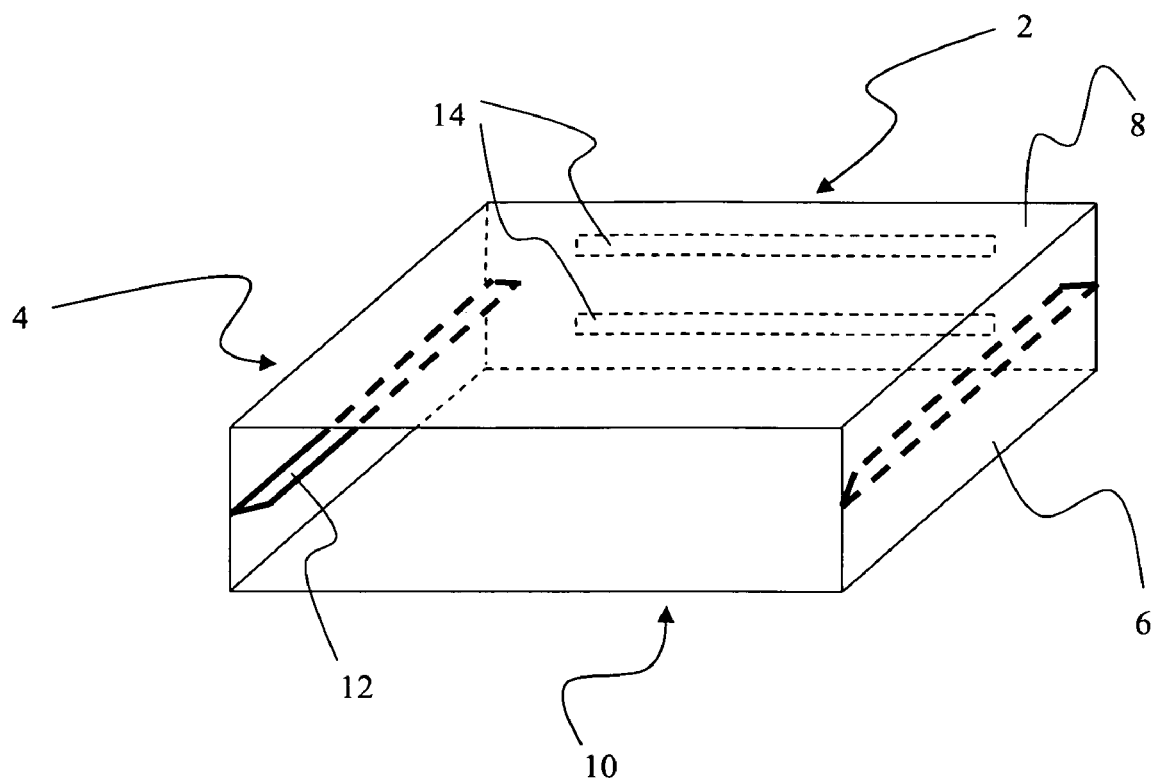
FIG. 1 shows an embodiment of a card holder according to the invention, in a 3-dimensional view.

In FIG. 1 the principle of the card holder according to the invention is illustrated in a 3-dimensional view. An inventive card holder, i.e. its housing, is constituted by a back face 2, a left side face 4, a right side face 6, a top face 8 and a bottom face 10. It should be noted that the faces do not necessarily comprise complete surfaces, i.e. it is possible to provide them with cut-outs or recesses. In the variant depicted here two electrical interfaces 14 are arranged on the back face 2. However it is also possible to arrange them on the top and bottom faces 8, 10, or in any other suitable position, depending on the type of card that shall be connectable and the respective location of contacts on the card. On the side faces 4 and 6 guiding elements 12 are provided. These guiding elements 12 define upper and lower slots for receiving accessory cards.

Such cards that are suited to be accommodated in one of said slots are in the following referred to as "single-height cards". The guiding elements 12 are provided for two purposes. First they are arranged to guide an accessory card, upon insertion of the card, to slide smoothly into the slot until the electrical interface 14 contacts the corresponding interface on the accessory card. And second they are intended to hold the card in the slot, i.e. restrict the card in a direction perpendicular to the top and bottom faces. This particularly concerns the case when only one such card is inserted while the other slot is left empty, so that the card will be fixed in its slot. In order to prevent an inserted card from sliding out from the slot conventional retention means can be provided which are not illustrated and also shall not be explained in detail here as they are per se known.

In contrast to the mentioned single-height cards there are also card types comprising a substantially double height. It should be noted that those cards are referred to as "double-height cards" even if there height is only substantially twice that of a single-height card. Such cards can also be inserted into the card holder of the invention, of course only one at a time. Depending on the type of guiding elements 12 double-height cards have to be provided with corresponding recesses for accommodating rigid or fixed guiding elements. As will be explained in conjunction with the following figures in preferred embodiments these guiding elements are arranged such that they can be displaced or pushed aside, when a double-height card is inserted, in order to allow such cards to slide into the slot smoothly and easily, unobstructed by the protruding guiding elements. In that case double-height cards without lateral recesses for accommodating the guiding elements can be used as well.

Figure 2:
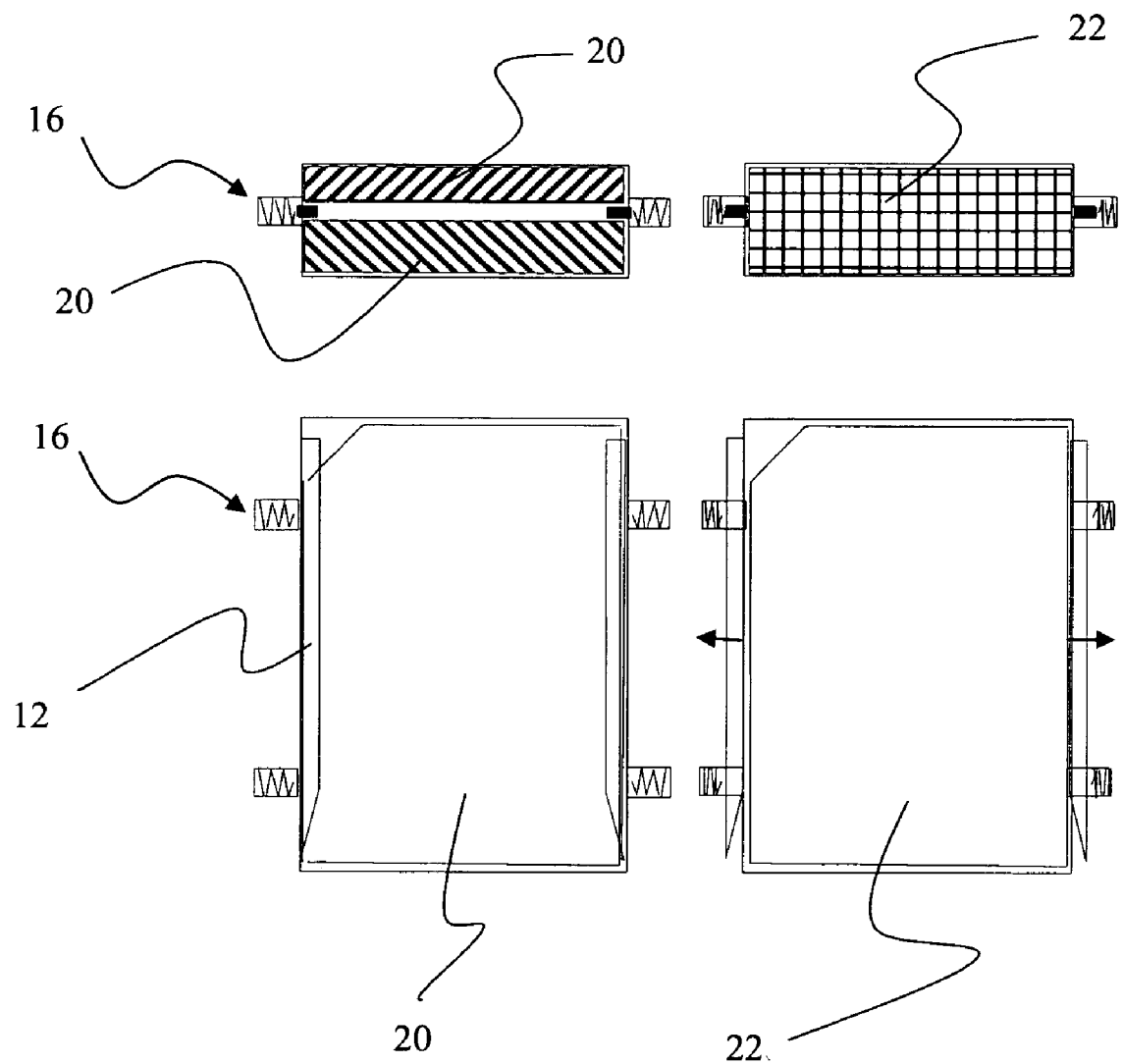
FIG. 2 shows another embodiment in both top and frontal view, wherein spiral springs are used to spring-bias the guiding elements.

In FIG. 2 another embodiment is illustrated in a top view and a frontal view. The lower left part of this figure shows a top view of an inventive card holder, wherein a single-height card 20 is inserted in the lower slot, i.e. below the guiding elements 12. These guiding elements 12 are constituted by guiding rails which are spring-biased by spiral springs 16. It can also be seen here that the guiding rails 12 comprise wedge-shaped sections facing the open side of the card holder (bottom side), in order to allow double-height cards without lateral recesses to be inserted easily and smoothly. Generally guiding rails or elements according to the invention are formed tapering towards their front ends, i.e. the ends facing towards the open face of the card holder, in order to achieve the abovementioned effect. When a double-height card 22 is inserted into the slot the wedge-shaped sections cause the guiding rails 12 to be displaced outwards, compressing the spiral springs 16, indicated by the small arrows. The card 22 can thus slide into the combined slot smoothly and is received in the inventive card holder, depicted on the lower right part of this figure.

In the upper left part of the figure a frontal view shows how single-height cards 20 and a double height card 22 fit into the card holder according to the invention. Single height cards 20 can be inserted into the upper or lower slots, wherein the guiding rails 12 remain in a position protruding partly into the slot. The guiding rails 12 thus act as a kind of "divider" between the slots, and keep two inserted single height cards 20 separated. The springs 16 are now in their unstressed state. The upper right part shows the situation where one double height card 22 is inserted. Here the guiding rails 12 are displaced sideways, compressing the springs 16, to make way such that the double height card 22 can easily be inserted unobstructed.

Figure 3:
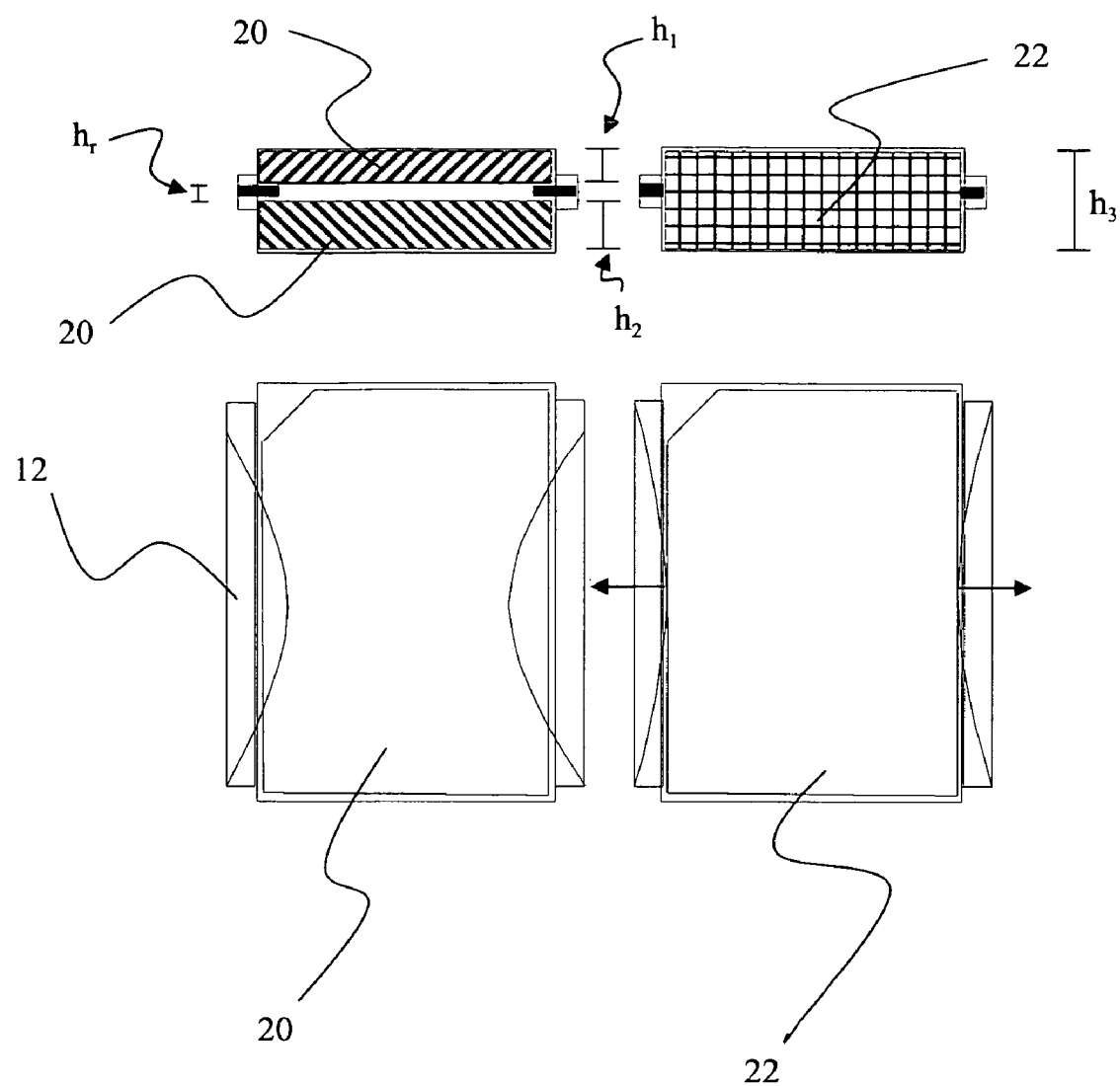
FIG. 3 shows another embodiment in a top view, wherein flat springs are used to spring-bias the guiding elements.

FIG. 3 shows similar situations as illustrated in FIG. 2, however the guiding elements 12 are embodied differently. The guiding elements 12 are constituted by curved resilient strips, e.g. of spring steel or the like. In an unstressed state, i.e. when only single-height cards 20 are inserted (one or two), the strips protrude into the slot and act as guiding elements. If a double-height card 22 is inserted into the slot the strips are deflected outward or compressed (indicated by the arrows), to make way for the card 22. The curved shape of the strips ensures that insertion of a double height card 22 is enabled smoothly and easily, in a similar fashion as with the wedge-shaped sections in FIG. 2. As the guiding elements are, in contrast to the embodiment of FIG. 2, integrated with the springs, this embodiment provides a card holder that can be manufactured simply and with low costs.

Similar to the embodiment of FIG. 2 the resilient property of the guiding elements can be utilized to apply a retaining force to an inserted double-height card. The compressed springs or resilient strips will try to return to their unstressed state, applying a spring force to an inserted card holding it in the slot. However it is also possible to use other additional retention means that shall not be discussed here as they are per se known.

The exemplary embodiments described in conjunction with FIGS. 2 and 3 are but examples of how the guiding elements can be implemented. For example the resilient strips can be designed with two or more arcs protruding into the slot in the unstressed state, or in other suitable shapes. Instead of the spiral springs other resilient spring elements can be used, like elastomeric elements, leaf springs and any other suitable element for spring-biasing the guiding elements. Furthermore the guiding elements can be formed in any suitable tapering fashion that will cause the guiding elements to be displaced sideways upon insertion, and which eases up the insertion, instead of wedge-shaped front sections or a curved shape.

Figure 4:
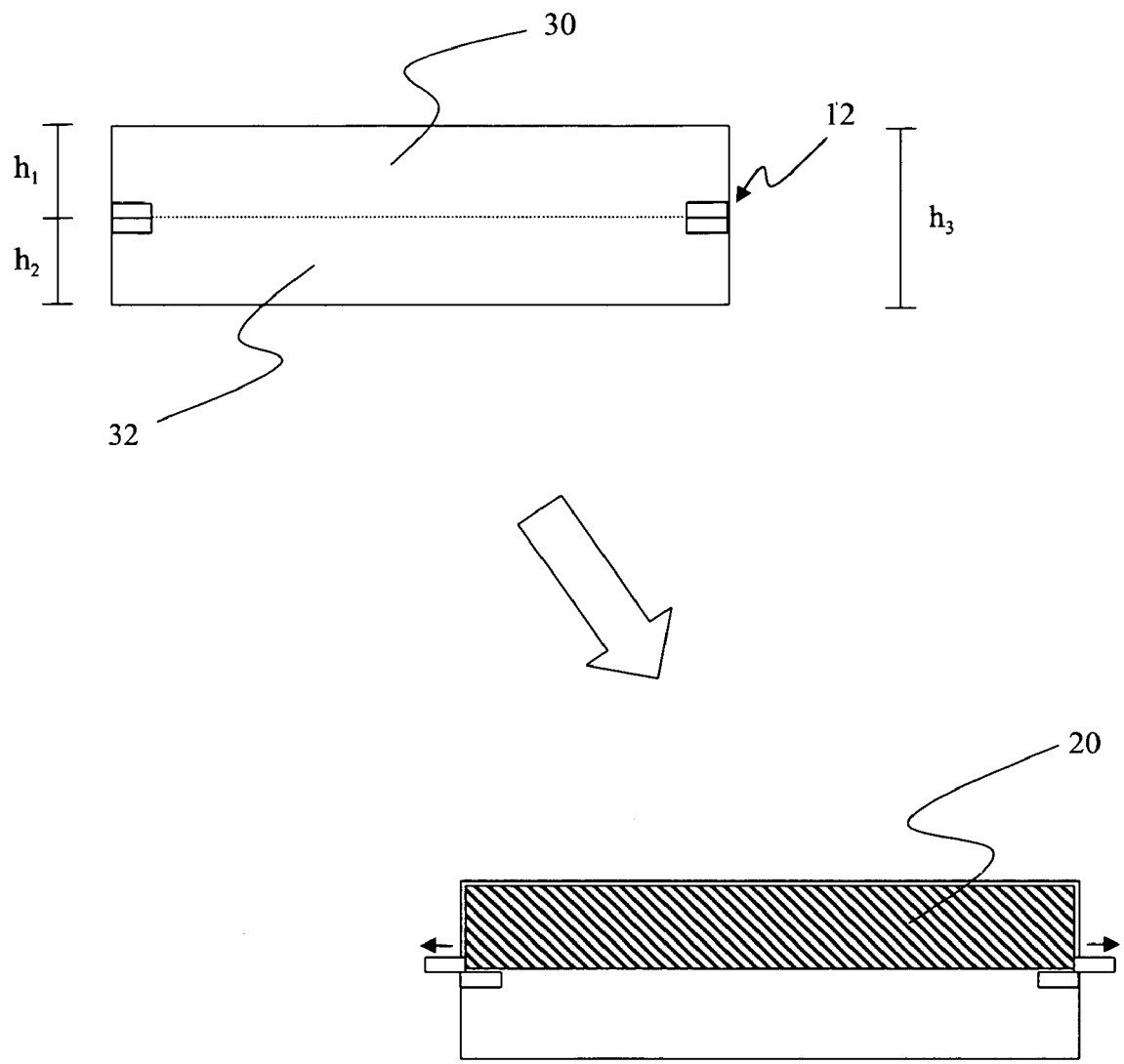
FIG. 4 shows yet another embodiment in a frontal view, illustrating a variant with split guiding elements.

FIG. 4 illustrates an advanced embodiment of the inventive card holder. The card holder is shown in a frontal view. Guiding elements 12 are provided, which define upper and lower slots 30 and 32 (divided by the dotted line). The guiding elements 12 are implemented in a split fashion, i.e. respectively comprising upper and lower sections, associated to the upper and lower slots. Upon insertion of a single height card 20 only the part or section of the guiding elements 12 is displaced that is associated to the respective slot, while the other guiding element section (here the lower one) remains in its unstressed state. The still protruding guiding element section keeps the inserted card 20 fixed in its slot. If another single-height card is now inserted the remaining guiding element section will as well be displaced such that the card can be received in the slot. In that configuration the two inserted cards will abut on each other, and the guiding elements 12 which are not necessary here are displaced out of the way, as the cards themselves restrict their movement in the vertical direction. A card of double height can of course also be inserted (not shown), where both upper and lower parts of the guiding elements will be pushed aside.

This specific embodiment enables to implement the inventive card holder in the maximum slim way with respect to the slot height(s), i.e. the combined slot is substantially two times as high as a single height card. In the case with two inserted single height cards this further avoids that a small gap is left between the cards, thus hindering dust and dirt from entering the card holder, and also improving the look and haptic impression of a device equipped with such a card holder. In other embodiments, wherein the guiding elements remain in their unstressed position, protruding into the slot space, the overall height of the slot of the card holder is instead substantially twice that of a single height card plus the height of the guiding elements.

In the latter case it may therefore be required, in order to securely retain cards of a height less then twice single height plus the guiding element's height in the slot without mechanical play, to provide additional retaining elements compensating for the height of the guiding elements. One possibility is to simply add another spring-biased guiding element on the top and/or bottom face, facing into the slot interior. Such guiding element would then similarly be displaced when single height cards are inserted, but apply a suitable remaining spring force to the double height card in a direction perpendicular to the top and bottom face, to compensate for the guiding element's height.

In FIG. 5 still another variant of a card holder according to the invention is shown. In the embodiment depicted here the guiding elements are constituted by resilient latches or tongues 16. The tongues or latches 16 are preferable cut out of the respective side face, however it is also possible to provide them as additional parts attached to the side faces. When one or two single height cards 20 are inserted into the card holder these latches 16 protrude into the slot inside and provide the guiding and retaining function required for such cards. If a double height card 22 is inserted the latches 16 are elastically displaced outwards, to allow the double height card 22 to be inserted smoothly and easily. This embodiment can be manufactured easily and at low costs. If the side faces of the card holder are made of metal or a suitable plastic material it is possible to simply cut or punch out the latches 16 and bend them inwards to provide the guiding elements.

Usually a double height card will use either of the two electrical interfaces provided for the two single-height cards. However it is within the scope of the present invention to provide an additional third electrical interface for a correspondingly equipped double-height card not using one of the other two electrical interfaces.

In an example embodiment the inventive card holder is arranged to receive the following three types of accessory cards. Here the lower slot is used for accommodating SD cards with the dimensions 32 mm×24 mm×2.1 mm and the upper slot is used for accommodating MMC cards with the dimensions 32 mm×24 mm×1.4 mm. The combined slot formed by the empty lower and upper slots is in this embodiment arranged to house a mini hard disk drive HDD with the dimensions 32 mm×24 mm×5 mm. That is, the SD and MMC cards comprise heights of 2.1 mm and 1.4 mm (there are also MMC cards having a height of 1.2 mm), and the HDD has a height of 5 mm, meaning that the guiding elements will have a height of substantially 1.5 mm. The mentioned dimensions are only exemplary, and it is also not required for the double height card to comprise a height that is more than the sum of the heights of the two single height cards, it can also be slightly less than that.

This example illustrates that the card holder of the invention is mainly intended for housing cards of the same length and width, but with different heights. However this is not to be understood as a limitation, as it is also within the scope of the present invention to house different single height cards with the same width but different length, or vice versa. Also, like in the example explained above, the upper and lower slots do not necessarily have the same height, i.e. are not necessarily symmetrical. As already discussed earlier the combined slot of the inventive card holder has a height that is substantially defined by the combined heights of the upper and lower slots plus (except in the embodiment of FIG. 4) the height of the guiding elements. That is, in a card holder of the invention the height of the guiding elements can be used to adjust the height of the combined slot, in order to receive various types of double height cards.

A card holder according to this invention can be used in various kinds of electronic devices, like mobile phones, PDAs, gaming consoles and the like. It is also not restricted to a use in mobile devices, but can as well be used in a desktop computer or like devices. Also the card holder can be used for all types of accessory cards, like memory cards, wireless interface cards for Bluetooth, WLAN and the like.

What is claimed is:

1. Card holder for a mobile electronic device for receiving accessory cards, said card holder comprising:
   a substantially cuboidal housing having an open front face for inserting accessory cards, said housing being constituted by a back face, a left and a right lateral face, and a top and a bottom face;
   at least two guiding elements protruding from the interior side of said left and right lateral faces, respectively, and extending parallel to and between said top and said bottom face;
   wherein:
   said guiding elements define an upper slot of a first height $h_1$ between said top face and said guiding elements and a lower slot of a second height $h_2$ between said bottom face and said guiding elements, for receiving accessory cards of first height $h_1$ and second height $h_2$, respectively;
   said upper and said lower slots together define a combined slot for receiving an accessory card of a third height $h_3$;
   said guiding elements are split into upper and lower guiding element sections associated to said upper and lower slots, respectively; and
   said upper and lower guiding element sections are resiliently arranged on said left and right lateral faces, such that the guiding element section associated to a respective slot is pushed aside by an accessory card of first height $h_1$ being inserted into that slot, such that said accessory card of first height can be received in that slot unobstructed by the associated guiding element section.

2. Card holder according to claim 1, wherein said guiding elements are resiliently arranged on said left and right lateral faces, in order to be pushed aside by an accessory card of a third height $h_3$ being inserted into said combined slot, such that said accessory card of third height can be received in said card holder unobstructed by said guiding elements.

3. Card holder according to claim 1, further comprising at least one resilient element arranged on the inner side of said top or said bottom face for spring-biasing accessory cards received in said card holder towards said bottom or said top face, respectively.

4. Card holder according to claim 1, further comprising an electrical interface adapted for electrically contacting an accessory card of the third height.

5. Card holder according to claim 1, wherein:
   said guiding elements are constituted by spring-biased guiding rails; and
   said guiding rails are formed tapering towards the open front face of said housing.

6. Card holder according to claim 1, wherein said guiding elements are constituted by resilient curved strips.

7. Card holder according to claim 1, wherein said guiding elements are constituted by resilient tongues.

8. Electronic device, comprising a card holder according to claim 1.

9. Device according to claim 8, wherein said electronic device is a mobile phone.

10. A mobile phone comprising a card holder for receiving an accessory card, wherein the card holder comprises:
    a substantially cuboidal housing having an open front face for inserting accessory cards, the housing including a back face, a left and a right lateral face, and a top and a bottom face;
    at least two guiding elements protruding from the interior side of said left and right lateral faces, respectively, and extending parallel to and between said top and said bottom face;
    wherein:
    said guiding elements define an upper slot of a first height between said top face and said guiding elements and a lower slot of a second height between said bottom face and said guiding elements, for receiving accessory cards of first height and second height respectively;
    said upper and said lower slots together define a combined slot for receiving an accessory card of a third height;
    said guiding elements are split into upper and lower guiding element sections associated to said upper and lower slots, respectively; and
    said upper and lower guiding element sections are resiliently arranged on said left and right lateral faces, such that the guiding element section associated to a respective slot is pushed aside by an accessory card of first height being inserted into that slot, such that said accessory card of first height can be received in that slot unobstructed by the associated guiding element section.

* * * * *